(12) United States Patent
Takahashi

(10) Patent No.: US 9,449,243 B2
(45) Date of Patent: Sep. 20, 2016

(54) IMAGE PROCESSING APPARATUS FOR RECOGNITION OF LINEAR STRUCTURES

(71) Applicant: SHIMADZU CORPORATION, Kyoto (JP)

(72) Inventor: Wataru Takahashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 281 days.

(21) Appl. No.: 13/719,032

(22) Filed: Dec. 18, 2012

(65) Prior Publication Data

US 2013/0243280 A1    Sep. 19, 2013

(30) Foreign Application Priority Data

Mar. 14, 2012   (JP) ................................ 2012-057108

(51) Int. Cl.
    G06K 9/00      (2006.01)
    G06K 9/46      (2006.01)
    G06T 7/00      (2006.01)

(52) U.S. Cl.
    CPC ............... *G06K 9/46* (2013.01); *G06K 9/4609* (2013.01); *G06T 7/0085* (2013.01); *G06T 7/0091* (2013.01); *G06T 2207/20144* (2013.01); *G06T 2207/30061* (2013.01)

(58) Field of Classification Search
    None
    See application file for complete search history.

(56) References Cited

U.S. PATENT DOCUMENTS

2006/0257006 A1* 11/2006 Bredno et al. ................ 382/128
2008/0247621 A1* 10/2008 Zarkh et al. .................. 382/130
2009/0016483 A1*  1/2009 Kawasaki .......... A61B 5/02007
                                                    378/4
2010/0002828 A1*  1/2010 Miura ..................... A61B 6/12
                                                    378/5
2010/0157041 A1*  6/2010 Klaiman et al. ................ 348/77
2010/0232672 A1*  9/2010 Jandt et al. ................... 382/132

FOREIGN PATENT DOCUMENTS

JP      2001-111835        4/2001
JP      2009-226141       10/2009

OTHER PUBLICATIONS

Lessard et al., "Wires segmentation in fluoroscopic images during cerebral aneurysm endovascular intervention," May 14-17, 2008, IEEE International Symposium on Biomedical Imaging, pp. 193-196.*

(Continued)

*Primary Examiner* — Jason Heidemann
(74) *Attorney, Agent, or Firm* — Andrew F. Young, Esq.; Lackenbach Siegel, LLP

(57) ABSTRACT

An image process apparatus is operative to obtain an image with high visual recognition property. A linear structural object incorporated into the original image is distinguished by two methods. A first method produces an evaluation image (P3) that evaluates whether each pixel is a linear structural object in the original image. A second method produces the difference image (P6) incorporating a linear structural object by obtaining the difference between the linear structural object incorporated into the original image and the portion other than the linear structural object. Since the linear structural object in the original image is extracted from an original image (P0) holding the contrasting density in the original image based on the two images related to the linear structural object produced by such different methods, and the apparatus provides an image having high visual recognition property.

14 Claims, 7 Drawing Sheets

(56) References Cited

OTHER PUBLICATIONS

Baert et al., "Guide-Wire Tracking During Endovascular Interventions, IEEE Transactions on Medical Imaging", Aug. 2003, vol. 22, No. 8, p. 965-972.*

Fallavollita et al., Towards an Automatic Coronary Artery Segmentation Algorithm Aug. 30-Sep. 3, 2006, Proceedings of the 28th IEEE EMBS Annual International Conference, pp. 3037-3040.*

JP 2012-057108 Office Action mailed Feb. 23, 2015, 4 pages—Japanese, 5 pages—English.

* cited by examiner

Integration

IMAGE PROCESSING APPARATUS FOR RECOGNITION OF LINEAR STRUCTURES

CROSS REFERENCE TO RELATED APPLICATIONS

This application relates to and claims priority from Japanese Ser. No. 2012-057108 filed Mar. 14, 2012, the entire contents of which are incorporated herein by reference.

FIGURE SELECTED FOR PUBLICATION

FIG. 1.

BACKGROUND OF THE INVENTION

1. Field of the Invention

The present invention is related to an image processing apparatus that can process the image taken by radiation photography so that a linear structural object in the image becomes visually and easily recognizable.

2. Description of the Related Art

Conventionally, it is known that a radiation photography apparatus that can take an image of a subject by using a radiation is employed in a medical treatment facility.

One such radiation photography apparatus may be used in order to take the image of a guide wire inserted into a blood vessel of a subject. For example, Patent Document 1 disclosed the apparatus that conducts such image processing.

Unfortunately, there is no guarantee that the guide wire is clearly incorporated into the image even if the sight-through image of the subject is taken with the radiation photography apparatus. Accordingly, the prior radiation photography apparatuses attempts to process the image to increase the visual recognition property of the guide wire in the image but with poor results.

A specific example of prior image processing is illustrated according to the image processing disclosed by Patent Document 1, JP-A 2001-111835, the entire contents of which are incorporated herein by references. As shown, a statistical processing comprises an elimination of noises incorporated into the image. This noise elimination processing does not eliminate the guide wire. Thus, according to the prior constitution, the image can be obtained in which the guide wire is clearer because noises are eliminated.

PRIOR ART DOCUMENT

Patent Document 1: JP-A 2001-111835

ASPECTS AND SUMMARY OF THE INVENTION

Problems to be Solved by the Invention

There are several problems in the prior image processing that require solution. Specifically, the prior image processing can only provide an image having a low visual recognition property. Also specifically, the prior image processing cannot perform an enhancement of the guide wire.

Additionally, when the guide wire is unclear in the image, the cause is not limited to the noise in the image. Further, if the guide wire is per se incorporated faintly into the image, it may be hard to see the guide wire. Finally, in the prior art it is not possible to process the image to enhance the guide wire.

Accordingly, even if image processing with the prior constitution is performed, the faintly incorporated guide wire in the image remains as-is. In fact, an image providing low visual recognition property can be only obtained in the prior image processing.

The present invention is performed considering such detriments and facts and the purpose of the present invention is to provide an image processing apparatus that can obtain an image with high visual recognition property.

Means for Solving the Problem

The present invention comprises the following constitution and features to solve the above mentioned problems.

Specifically, an image processing apparatus according to the present invention is an image processing apparatus that processes the original image obtained by seeing through a subject, comprising an evaluation image producing means that produces an evaluation image that evaluates each pixel based on the original image whether each pixel is a linear structural object in the original image; a direction image producing means that produces a direction image that indicates the direction to which a line extends, given each pixel is the linear structural object based on the original image; a difference image producing means that produces a difference image in which a pixel value except the linear structural object is subtracted from the pixel value of the portion of the linear structural object based on the direction image; and an extraction image producing means that produces an extraction image extracted from the original image, in which the linear structural object in the original image holds contrasting density in the original image, based on the evaluation image and the difference image.

Operation and Effect of the Invention

According to the proposed invention, an image processing can be performed to enhance the linear structural object incorporated into the original image. Specifically, two methods distinguish the linear structural object incorporated into the original image. The first method is to make an evaluation image that evaluates whether or not each pixel belongs to a linear structural object in the original image. According to this first method, the position of the linear structural object in the original image can be readily identified. The second method is to produce the difference image incorporating the linear structural object by obtaining the difference between the linear structural object incorporated into the original image and the other elements than the linear structural object. Accordingly, it can be determined how much different pixel value the linear structural object in the original image is incorporated with, in comparison with the pixels other than the linear structural object.

One characteristic of the present invention is that a linear structural object in the original image is extracted from the original image holding the contrasting density of the original image based on the two images related to the linear structural object produced by such different methods.

The evaluation image contains only the information about the position of the linear structural object in the original image.

On the other hand, the difference image includes a false image along with performing directional differencing processing in all areas of the original image.

If the extraction of the linear structural object by using two images having such drawback is performed, the drawbacks of each of the two methods can be readily compensated.

Accordingly, as the obtained extraction image from the original image holding the contrasting density is the linear structural object only, it has a high visual recognition property.

Further, in the above image processing apparatus, it is preferable if it is further equipped with a reduction means that reduces and outputs the original image to the evaluation image producing means and the direction image producing means.

Operation and Effect of the Invention

A further specific feature of an apparatus of the present invention is discussed. As mentioned above, if the apparatus is equipped with a reduction means to reduce the original image, a thick linear structural object contained in the original image can also be extracted.

Further, in the above image processing apparatus, it is further preferable if the apparatus is equipped with an analysis means that analyzes the original image by using two dimensional Hessian matrix and outputs the analytical results to the evaluation image producing means and the direction image producing means, and if the evaluation image producing means and the direction image producing means produce an evaluation image and a direction image based on the analytical results.

Operation and Effect of the Invention

The above additionally demonstrates specific features of an apparatus of the present invention. If the analysis means acts using the two-dimensional Hessian matrix, the position of the linear structural object and the extending direction of the linear structural object can be obtained accurately and at high-speed and in real-time.

Further, the image processing apparatus of the present invention is an image processing apparatus that processes plural original images obtained by continuously shooting a subject over time comprises; an array means that arrays plural original images in time direction and produces voxel data; an evaluation image producing means that produces an evaluation image that evaluates each voxel whether it is a plane constitution on the voxel data or not based on the voxel data; a direction data producing means that produces direction data that indicate the direction of the normal line of the plane given each voxel belongs to the plane constitution on the voxel data based on the voxel data; a direction image producing means that produces a direction image that indicates the extending direction of the line given each pixel is a plane constitution in the original image based on the direction data; a difference image producing means that produces a difference image in which the pixel value of the other than the linear structural object is subtracted from the pixel value of the element of the linear structural object based on the direction image; and an extraction image producing means that produces an extraction image in which the linear structural object in the original image is extracted base on the extraction image and the difference image.

Operation and Effect of the Invention

The above invention also enables a dynamic picture image. Specifically, an image processing to find out a plane structural object for the voxel data arraying the original image in the time direction is performed. Accordingly in so doing, the linear structural object can be accurately extracted from the original image even if many noise components are included in the original image. Further, even if noises in the original image are accidentally in a linear array, beneficially they do not appear as plane data on the voxel data, because the appearance position of noises in the original image changes over time. Accordingly, a linear noise cluster that appears in the original image cannot be misrecognized as a linear structural object.

In addition, it is further preferable that the above image processing apparatus is equipped with a reduction means that reduces voxel data and outputs to the evaluation image producing means and the direction data producing means.

Operation and Effect of the Invention

A further operation and effect of the present invention is demonstrated by the present invention. If the above reduction means to reduce voxel data is so employed, even a thick linear structural object included in the original image can be extracted. Further, in the above image processing apparatus, it is further preferable that the invention is equipped with an analysis means that analyzes the voxel data by using three-dimensional Hessian matrix and outputs the analytical results to the evaluation image producing means and the direction data producing means, and when the evaluation image producing means and the direction data producing means produce an evaluation image and a direction data based on the analytical results.

Operation and Effect of the Invention

The above further demonstrates specific features of an apparatus of the present invention. Namely, if the analysis means acts using the three-dimensional Hessian matrix, the position of the plane structural object and the extending direction of the plane structural object can be obtained accurately and at high-speed. Further, it is preferable if the evaluation producing means uses monotonic and non-linear function when it produces an evaluation image.

Operation and Effect of the Invention

The above further demonstrates specific features of an apparatus of the present invention. Namely, as the evaluation image producing means acts regarding the monotonic and non-linear function, the evaluation image showing the position of the plane structural object in a close aspect to the binary image can be produced without disturbing the magnitude correlation of the evaluation values of the plane structural object. Further, it is also preferable that a difference image producing means produces a difference image by conducting an anisotropic filter to the original image according to the direction indicated by the direction image.

Operation and Effect of the Invention

The above further demonstrates specific features of the present invention. Wherein, if the difference image producing means acts using the anisotropic filter, it becomes possible to extract the shape of the linear structural object from the original image holding the contrast density of the linear structural object in the original image. It is further preferable that a morphologic processing means performs a morphologic processing on the extraction image in the above image processing apparatus.

Operation and Effect of the Invention

The above further demonstrates a specific feature of an apparatus of the present invention. If the morphologic processing is performed on the extraction image, as the fine false image in the extraction image, which is extracted by misrecognizing noises as a linear structure object is deleted, the visual recognition property of the extraction image is further improved. It is further preferable that a superimposition image producing means that produces a superimposition image in which the extraction image and the original image are superimposed is equipped in the above image processing apparatus.

Operation and Effect of the Invention

The above further demonstrates a specific feature of an apparatus of the present invention. If a superimposed image is produced by superimposing the extraction image and the original image, the linear structural object can be further accurately recognized because the process in which the linear structural object is being incorporated in the image of the subject can be seen.

Effect of the Invention

According to the present invention, the two methods distinguish the linear structural object incorporated into the original image. The first method is to produce an evaluation image that evaluates whether each pixel is a linear structural object in the original image. The second method is to produce a difference image in which the linear structural object is incorporated by taking the difference between the linear structural object incorporated into the original image and the other element than the linear structural object.

The characteristic of the present invention is that a linear structural object in the original image is extracted from the original image holding the contrasting density in the original image based on the two images related to the linear structural object produced by such different methods.

Accordingly, as the linear structural object is extracted from the original image holding the contrasting density, the image having a high visual recognition property can be obtained.

The above and other aspects, features, arrangements, constitution, characteristics, and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
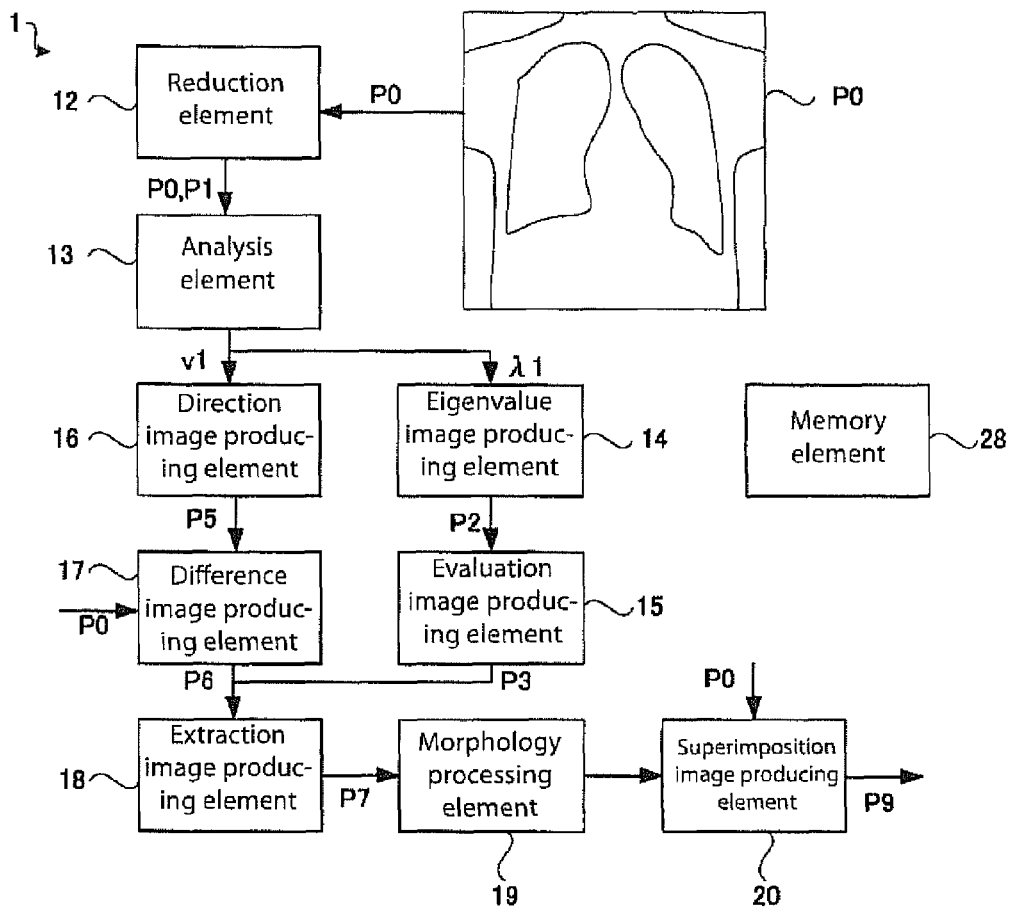
FIG. 1 is a block figure illustrating an image processing apparatus according to one aspect of the present invention.

Reference will now be made in detail to various embodiments or features or components of the invention. Wherever possible, same or similar reference numerals are used in the drawings and the description to refer to the same or like parts or steps. The drawings are in simplified form and are not to precise scale. The words 'couple' or 'send' or 'modify' and similar terms do not necessarily denote direct and immediate connections, but also include operative connections through intermediate elements or devices to effectuate the proposed invention, such that there is an operative connection as needed to effectuate the invention. For purposes of convenience and clarity only, directional (up/down, etc.) or motional (forward/back, etc.) terms may be used with respect to the drawings. These and similar directional terms should not be construed to limit the scope in any manner. It will also be understood that other features, embodiments, systems, methods, components, or examples may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent. Additionally, it will be understood following review that the terms, embodiment, example, feature(s), system, component, methods, aspects, etc. are non-limiting and not restrictive in operation, such that the proposed invention includes interconnected operational components, features, systems, and methods etc., enabled to achieve the goals and results discussed herein without departing from the scope and spirit of the present invention.

The features that are considered characteristic of the invention are set forth with particularity in the appended claims. The overall invention itself, however, both as to its structure, system, result, and its operation together with the additional aspects and advantages thereof will best be understood from the following description of the preferred embodiment of the present invention when read in conjunction with the accompanying drawings.

Embodiments of the present invention are now illustrated.

X-ray in proposed embodiments corresponds to the radiation of the present invention, but it will be understood that there is no limitation to the specific x-ray wavelength, and that other wavelengths or combinations of wavelengths may be employed without departing from the scope and spirit of the present invention. Further, a dark line of such as a guide wire image incorporated in an image corresponds to a linear structural object of the present invention.

Referring to FIG. 1, an image processing apparatus or system according to an embodiment comprises an operative apparatus in which if an image (hereinafter original image P0) is obtained by filming a subject with X-ray is input, a processing image (superimposition image P9) that is adjusted as such a guide wire image incorporated into the original image P0 is output.

General Constitution of the Image Processing Apparatus

Referring to FIG. 1, the image processing apparatus 1 according to this embodiment, comprises an analysis element 13 that analyzes the original image P0 by using two-dimensional Hessian matrix, an evaluation image producing element 15 that produces an evaluation image P3 that evaluates whether each pixel is a linear structural object in the original image P0, a direction image producing element 16 that produces a direction image P5 that indicates the extending direction of the line given each pixel is the linear structural object in the original image P0 based on the original image P0, a difference image producing element 17 that produces an difference image P6 in which a pixel value of the element than the linear structural object is subtracted from the pixel value of the element of the linear structural object based on the direction image P5, and an extraction image producing element 18 that produces P7 in which the linear structural object in the original image P0 is extracted from the original image P0 along keeping the contrasting density in the original image P0 based on the evaluation image P3 and the difference image P6.

The analysis element 13 corresponds to an analysis means of the present invention and the evaluation image producing element 15 corresponds to an evaluation image producing means of the present invention.

Further, the direction image producing element 16 corresponds to the direction image producing means of the present invention and the difference image producing element 17 corresponds to a difference image producing means of the present invention.

The extraction image producing element 18 corresponds to an extraction image producing means of the present invention.

Further, the image processing apparatus comprises a reduction element 12 that reduces the original image P0 and outputs the reduction image to the evaluation image producing element 15 and the direction image producing element 16, a morphology performing element 19 that performs a morphology processing on the extract image P7, and a superimposition image producing element 20 that produces a superimposition image (processing image P9) in which the extract image P7 and the original image P0 are superimposed.

Further, the image processing apparatus 1 comprises an eigenvalue image producing element 14 that produces an eigenvalue image P2 in which the eigenvalues that are results obtained by an analysis that the analysis element 13 performs on the original image P0 are arrayed and outputs the eigenvalue image P2 to the evaluation image producing element 15.

The reduction element 12 corresponds to the reduction means of the present invention and the morphology processing element 19 corresponds to the morphology processing means of the present invention.

Further, the superimposition image producing element 20 corresponds to the superimposition producing means of the present invention.

A memory element 28 is an operative memory device in which filters and parameters are operably stored when each element, 12, 13, 14, 15, 16, 17, 18, 19 and 20, respectively operates.

Each element 12, 13, 14, 15, 16, 17, 18, 19 and 20 can operatively access the memory element 28 according to operative necessity, and it will be understood that memory element 23 and apparatus 1, or the system and method employing the same contain operative processing features, processors, computer processing units (CPUs) and components and arrangements, effective to enable operative operation of apparatus 1 (and respectively the following apparatus 21).

Main Operation of the Image Processing Apparatus

Main operation for the image processing apparatus 1 is now illustrated. An image processing apparatus is operated with mainly an analysis element 13, an eigenvalue image producing element 14, an evaluation image producing element 15, a direction image producing element 16, a difference image producing element 17, and an extraction image producing element 18. Accordingly, the operation of these main elements is illustrated prior to the illustration of the operation of each element 12, 19 and 20.

Operation of Analysis Element

An original image P0 that is input to the image processing apparatus 1 is input to the reduction element 12. For convenience sake of illustration, the reduction element 12 outputs the original image P0 to the analysis element 13 without reduction processing of the image. The analysis element 13 first differentiates the original image on lateral direction and longitudinal direction.

Differentiation operation of the analysis element 13 is illustrated.

Figure 2:
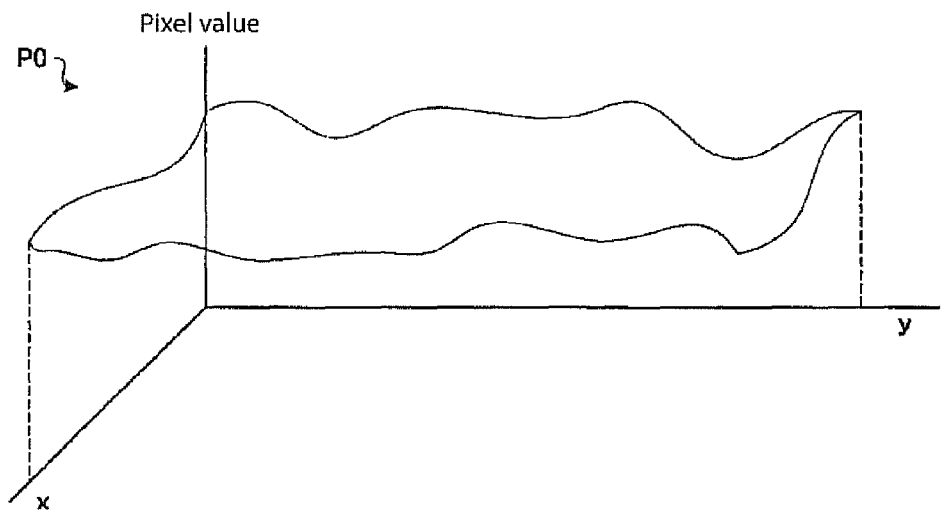
FIG. 2 is a schematic figure illustrating an operation of the image processing apparatus according to one aspect of the present invention.

In the original image P0, a position in the image and a pixel value are correlated. Specifically, when the positions of x-direction and y-direction in the original image P0 are specified, the pixel value of pixels positioned there can be obtained. Specifically, referring to FIG. 2, the original image P0 can be deemed as 2 variable functions in which the pixel value is related about 2 variables of x-direction (lateral direction) and y-direction (longitudinal direction). If the pixel value is d, the relation of d=f(x, y) can exist.

The analysis element 13 differentiates partially the original image P0 in x-direction using a differential filter, and then further differentiates partially that obtained differential function in x-direction. Further, the analysis element 13 differentiates partially the original image P0 in x-direction, and then further differentiates partially that obtained differential function in y-direction.

Similarly, the analysis element 13 differentiates partially the original image P0 in y-direction, and then further differentiates partially that obtained differential function in y-direction.

The analysis element 13 produces the two-dimensional Hessian matrix H using these. The Hessian matrix H appears such as a below matrix.

$$H = \begin{pmatrix} \frac{\partial^2 f}{\partial x^2} & \frac{\partial^2 f}{\partial x \partial y} \\ \frac{\partial^2 f}{\partial y \partial x} & \frac{\partial^2 f}{\partial y^2} \end{pmatrix}$$ [Mathematical formula]

The quadratic differential function given by the partial differentiation in x-direction followed by the partial differentiation in y-direction and the quadratic differential function given by the partial differentiation in y-direction followed by the partial differentiation in x-direction are the same function.

Accordingly, the Hessian matrix is a symmetrical matrix; and has two eigenvalues $\lambda 1$ and $\lambda 2$ and its corresponding eigenvector to these. Where the absolute value of the eigenvalue $\lambda 1$ is set as larger than the absolute value $\lambda 2$. The analysis element 13 obtains an eigenvalue and an eigenvector from the Hessian matrix H.

Next, the analysis element 13 calculates the eigenvector v1 corresponding to the eigenvalue $\lambda 1$. The eigenvector v1 is a vector containing the elements in an x-direction and y-direction.

Operation of the Eigenvalue Image Producing Element

The analysis element 13 delivers the eigenvalue $\lambda 1$ having the maximum absolute value to the eigenvalue image producing element 14. The Hessian matrix is where the functions corresponding to the position of the original image are arrayed in a matrix.

Accordingly, the eigenvalue $\lambda 1$ should vary corresponding to the position of the original image P0. The original image producing element 14 arrays the eigenvalue $\lambda 1$ as corresponding to the position of the original image P0 and the eigenvalue $\lambda 1$ produces the eigenvalue image P2 arrayed in a two-dimensional matrix state.

Operation of the Evaluation Image Producing Element

The eigenvalue image producing element 14 delivers the eigenvalue image P2 to the evaluation image producing element 15. The evaluation image producing element 15 adjusts the value of the eigenvalue $\lambda 1$ by exerting a predetermined function on each eigenvalue $\lambda 1$.

Specifically, the evaluation image producing element 15 converts all eigenvalue $\lambda 1$ having a positive high value in the eigenvalue image P2 to a value almost near 1. And the evaluation image producing element 15 converts all eigenvalue $\lambda 1$ having a low value in the eigenvalue image P2 to a value almost near 0. Further, the evaluation image producing element 15 converts all eigenvalue $\lambda 1$ having an intermediate value in the eigenvalue image P2 to any values, e.g. in between 0.1 and 0.9. According to such operation, the eigenvalue $\lambda 1$ having any values between −16.384 and 16.383 will become any values between 0 and 1 by conversion.

A monotonic increasing and non-linear function is selected as a function that the evaluation image producing element 15 uses to convert. Specifically, such as a logistic function is used.

Figure 3:
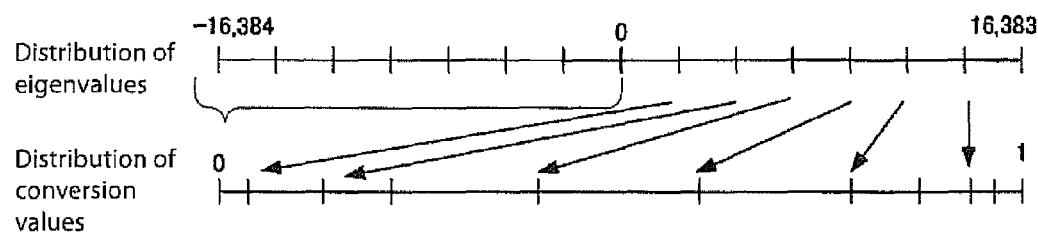
FIG. 3 is a schematic figure illustrating an operation of the image processing apparatus according to one aspect of the present invention.

Referring to FIG. 3, the evaluation image producing element 15 keeps the scale of a positive intermediate eigenvalue $\lambda 1$ in the eigenvalue image P2 and converts also the value by compressing the scale of an extreme eigenvalue $\lambda 1$ or a negative eigenvalue $\lambda 1$.

Thus the evaluation image producing element 15 produces the evaluation image P3 by converting the eigenvalue image P2. Further, all negative eigenvalue $\lambda 1$ are converted to 0.

Meaning of the eigenvalue $\lambda 1$ is illustrated.

It will be understood that the absolute value of the secondary partial differentiation value in the original image P0 is large when the absolute value of the eigenvalue $\lambda 1$ is large. Further, the sign of the eigenvalue $\lambda 1$ corresponds as-is to the sign of the secondary partial differentiation. Largeness of the absolute value of the secondary partial differentiation value shows how much steep the U curve in the function is. Further, the sign of the secondary partial differentiation value corresponds to the concavity and convexity of the U curve in the function.

Figure 4:
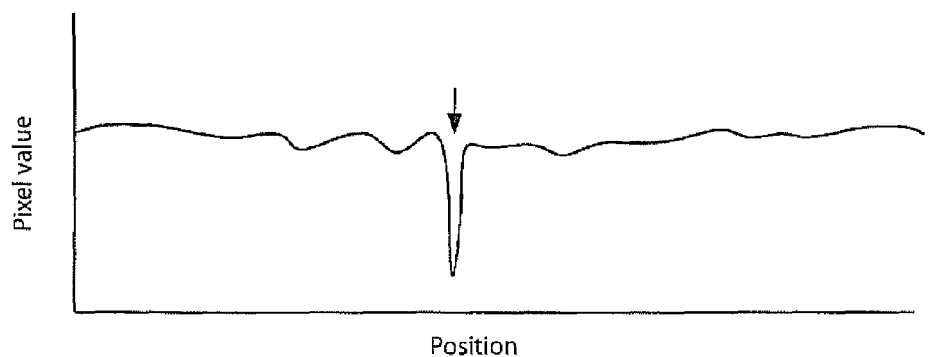
FIG. 4 is a schematic figure illustrating an operation of the image processing apparatus according to one aspect of the present invention.

For example, there is a relationship shown in FIG. 4 between a position and a pixel value. The arrow in FIG. 4 shows a large convex in the graph. Such area has an extremely small pixel value compared with its surrounding area and shows a dark line in the image.

When the graph of FIG. 4 is differentiated twice along the position, the differentiation value will be a high positive value at the arrow area. Specifically, the evaluation image P3 in which the converted values are arrayed where the eigenvalues are in scaling shows the minimal position where the original image P0 is deemed as a function in which the position and the pixel value are correlated.

An area having a value in proximity of 1 in the evaluation image P3 is the area incorporating the dark line in the original image P0, and an area having a value in proximity of 0 is a flat area without incorporating the dark line in the original image P0.

Reversely, the differentiation value in the area incorporating a bright line in the original image P0 has a small negative value. Specifically, if a bright line is expected to be extracted, a monotonic decreasing and non-linear function is selected as the function that the evaluation image producing element 15 uses for conversion.

Further specifically, the evaluation image P3 in which the converted values of which the eigenvalues are in scaling are arrayed shows the maximum position where the original image P0 is deemed as a function in which the position and the pixel value are correlated. An area having a value in proximity of 1 in the evaluation image P3 incorporates the bright line in the original image P0, and an area having a value in proximity of 0 is a flat area without incorporating the bright line in the original image P0.

Operation of the Direction Image Producing Element

The analysis element 13 delivers the eigenvector v1 to the direction image producing element 16. The direction image producing element 16 calculates an angle $\theta 1$ between eigenvalue v1 and x-axis. And the analysis element 13 calculates $\theta 2$ by adding such $\theta 1$ and 90°. The Hessian matrix H is a matrix of functions corresponding to the position of the original image P0. Accordingly, the angle $\theta 2$ should change corresponding to the position of the original image P0.

The direction image producing element 16 arrays the angle $\theta 2$ corresponding to the position of the original image P0 and produces a direction image P5 in which the angles $\theta 2$ are arrayed in like a two-dimensional matrix.

The angle $\theta 2$ in the actual direction image P5 is not set to obtain any values between 0° and 360°. Specifically, the angle $\theta 2$ is sorted to an approximate angle to one of 18°, 36°, 54°, 72°, 90°, 108°, 128°, 144° and 162° by a discretization processing. Accordingly, the direction image P5 is an image in which the values that are one of 10 variations between 0° and 162° are arrayed in like a two-dimensional matrix.

Further accordingly, as the direction image producing element 16 produces the direction image P5 by narrowing the angle to 10 variations, an arithmetic processing in a later step will be simplified.

Further, the main reason why the maximum value of the angle $\theta 2$ is 162° but not 360° is illustrated below.

The meaning of the angle $\theta 2$ is illustrated.

The angle $\theta 2$ is 90° rotated angle of the angle between the eigenvector v1 and x-direction. The meaning of the direction of the eigenvector v1 is considered.

Figure 5:
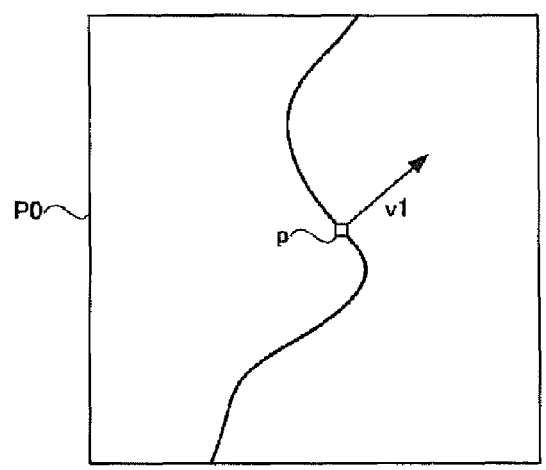
FIG. 5 is a schematic figure illustrating an operation of the image processing apparatus according to one aspect of the present invention.

Referring now to FIG. 5, the pixel p on the dark-line in the original image P0 is considered. The eigenvector corresponding to this pixel p is shown as v1 in FIG. 5. The eigenvector v1 is an eigenvalue of the eigenvalue $\lambda 1$ of which the absolute value is larger.

Accordingly, the direction that the eigenvector v1 indicates means the direction that is the orthogonal direction to the articulating direction of the dark-line in the original image P0. Specifically, the angle θ2 is the angle between the direction where the direction that is the orthogonal direction to the direction along the dark-line is rotated at 90° and x-direction.

Briefly, the angle θ2 is the angle between the direction of the dark-line incorporated in the original image P0 and x-direction. Herein the direction along the dark-line means the extending direction of the tangent-line tangent to the dark-line at the pixel p.

The reason why 162° is set as the maximum angle of the angle θ2 is illustrated.

Figure 6:
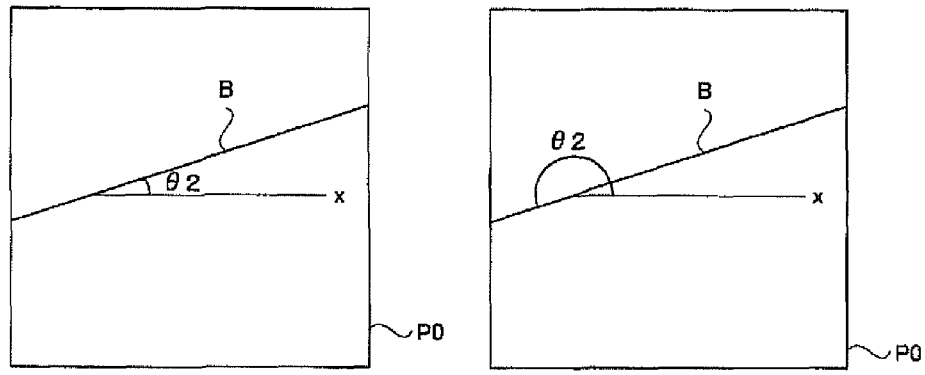
FIG. 6 is a schematic figure illustrating an operation of the image processing apparatus according to one aspect of the present invention.

Given the angle θ2 is 18°, the angle between x-axis and the dark line B is 18° as shown in the left side of FIG. 6. As well, given the angle θ2 is 198°, the angle between x-axis and the dark line B is 198° as shown in the right side of FIG. 6. As it becomes understandable when the left side and the right side of FIG. 6 are compared, the direction of the dark line B when the angle θ2 is 18° and the dark line B when the direction of the dark line angle θ2 is 198° are coincident.

Specifically, even if 180° is added to the angle θ2, the direction of the dark line B shown by this angle is the same direction shown by the original angle θ2. In other words, even if the angle θ2 is set not less than 0° but not more than 180°, the direction of the dark line can be expressed over all directions. In reality, the possible maximum angle θ2 is 162° because the discretization processing is performed.

Operation of the Difference Image Producing Element

The direction image P5 is delivered to the difference image producing element 17. Referring to the direction image P5, the difference image producing element 17 obtains a difference between the linear structural object incorporated into the original image and the other portion than the linear structural object and produces the difference image incorporating the linear structural object.

Hereinafter an operation of the difference image producing element 17 is illustrated.

Figure 7:
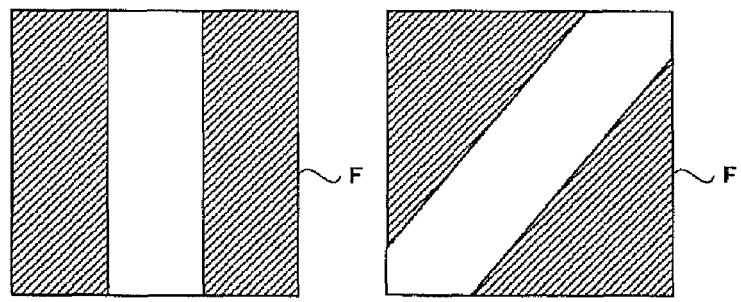
FIG. 7 is a schematic figure illustrating an operation of the image processing apparatus according to one aspect of the present invention.

The left side of FIG. 7 shows a filter that the difference image producing element 17 produces. The left side filter F of FIG. 7 consisting 3 areas is a difference filter that obtains the difference between a pixel value of the center area and a pixel value of the surrounding area shown as shadow area. When the filter F is performed on the original image P0, it can be known that the pixel value of the attention pixels is how much different compared to the pixel value of the surrounding pixels. For example, a size of the filter F is horizontally and vertically 15×15 pixels, but may be otherwise within the scope and spirit of the present invention.

Further, the filter F of the difference image producing element 17 is an anisotropic filter (anisotropic smoothing filter) having a direction property. For example, the filter F shown in the left side of FIG. 7 is an adequate filter for the original image P0 in which a dark line is incorporated in vertical direction. Practically, the dark line is incorporated curvaceously in the original image. Accordingly, when filtering with the difference image producing element 17 is performed on the original image P0, the filter must be switched in accordance with the extending direction of the dark line that changes according to the portion of the dark line.

Then, the memory element 28 operatively memorizes plural filters, for example, as shown in the right side of FIG. 7, which are obtained by rotating the filter shown in the left side of FIG. 7 every 18°. The difference image producing element 17 produces a difference image by acting any filters memorized in the memory element 28 on each pixel composing the original image P0. 10 kinds of filter for this operation are ready to be used corresponding to the direction in which the dark line extends.

The difference image producing element 17 has to operatively decide during operation which filter among 10 kinds should be performed on each pixel in the original image P0. Then, the difference image producing element 17 selects a filter referring to the direction image P5. The direction image P5 is an image showing the extending direction of the dark line incorporated in each pixel. Accordingly, the difference image producing element 17 produces the difference image P6 by filtering with a filter selected in accordance with 10 directions that the direction image P5 for each pixel composing the original image P0 indicates.

The difference image P6 is performed a smoothing processing in the extending direction of the dark line for the original image P0 and is obtained by subtracting the pixel value of the other portion than the dark line from the pixel value of the dark line.

Figure 8:
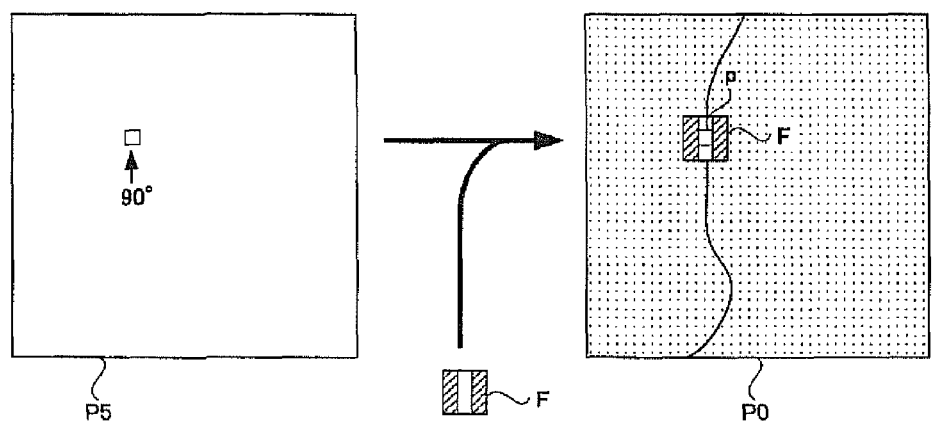
FIG. 8 is a schematic figure illustrating an operation of the image processing apparatus according to one aspect of the present invention.

FIG. 8 shows a status of which the difference image producing element 17 is acting on the pixel p of the original image P0. The difference image producing element 17 obtains the pixel value of the pixels of the direction image P5 (corresponding pixel) that exists at the same position of the pixel p. The pixel value of the direction image P5 is the value showing the extending direction of the dark line.

Given the corresponding pixel is a pixel value showing 90°, the difference image producing element 17 gets the vertical filter F, illustrated in the left side of FIG. 7, from the memory element 28 and acts it on the pixel p of the original image P0. At this point, the pixel p is positioned in the center of the filter F. The difference image producing element 17 acts the same operation on each pixel composing the original image P0 and produces the difference image P6 as shown in FIG. 9.

Figure 9:
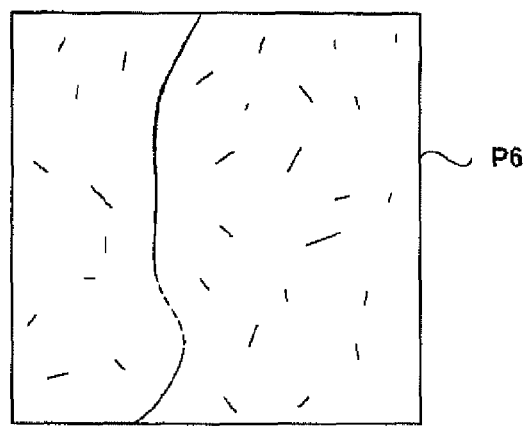
FIG. 9 is a schematic figure illustrating an operation of the image processing apparatus according to one aspect of the present invention.

As shown in FIG. 9, the difference image P6 is in the state wherein a subject image incorporated into the original image P0 disappears and the dark line incorporated into the original image P0 is extracted. The subject image is shown as half-tone dot meshing in FIG. 8. The dark line appeared in the difference image P6 maintains the information related to the pixel value of the original image P0.

Accordingly, if the dark line incorporated into the difference image P6 is carefully observed, the density of the dark line is partially different. The partial difference of the density of the dark line shows as-is the partial density observed when the dark line was incorporated into the original image P0.

Further, as also shown in FIG. 9, a fine line-like noise appears in the original image P0 other than the dark line. This is a false image that occurs when a filter having the direction property is performed on all directions of the original image P0. This false image must be eliminated. The elimination of the false image is performed by the extraction image producing element 18.

Operation of the Extraction Image Producing Element

The difference image P6 and the evaluation image P3 are delivered to the extraction image producing element 18. The extraction image producing element 18 produces the extraction image P7 in which the dark line is extracted from the original image P0 by an integration processing of the evaluation image P3 and the difference image P6. The evaluation image P3 specifies a portion where a dark line appears in the original image P0 as 1 and a portion where no dark line appears as 0.

Even though the evaluation image P3 includes a pixel value between 0 and 1, it is a close image to a binary image showing the position of the dark line in the original image P0. Accordingly, the evaluation image P3 has no information that indicates what is the density in which the dark line in the original image P0 is incorporated. As the difference image P6 is an image that is obtained by performing a direction filter on the original image P0, it holds the density information. But it is an image including a false image produced by performing the direction filter.

Figure 10:
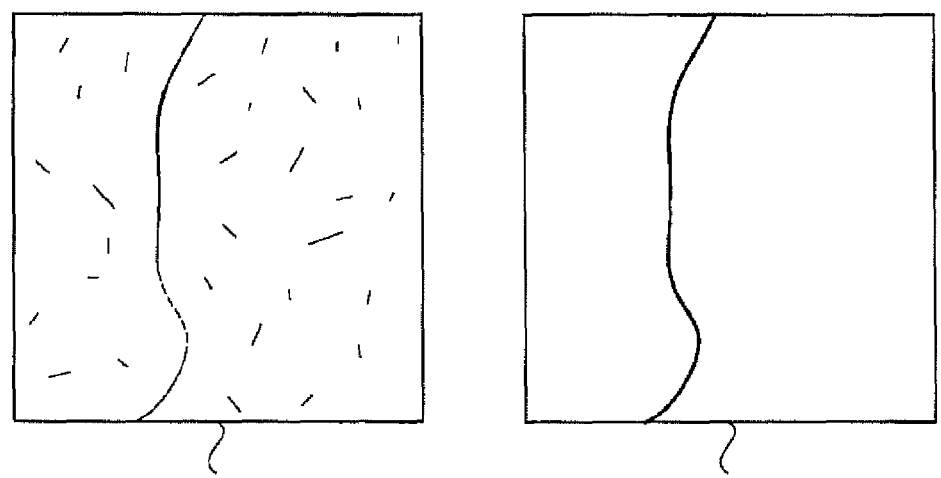
FIG. 10 is a schematic figure illustrating an operation of the image processing apparatus according to one aspect of the present invention.
Figure 10:
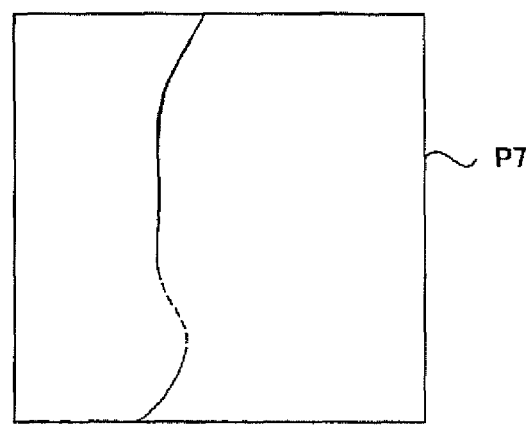

Then, referring to FIG. 10, if the integration processing of the evaluation image P3 and the difference image P6 are performed, the pixel value 0 of the evaluation image P3 is integrated to the pixel value of the difference image P6 in non-dark line portion of the original image P0 and then the pixel value of that portion becomes 0. Thus the false image appeared in the difference image P6 will be eliminated.

The produced extraction image P7 is an image as if the dark line incorporated into the original image P0 is extracted as-is. A visual recognition of the dark line in the extraction image P7 is operatively effective and easy.

Operation of the Superimposition Image Producing Element

The extraction image P7 is input to the morphology processing element 19. For convenience sake of illustration, the morphology processing element 19 outputs the extraction image P7 to the superimposition image producing element 20 without any processing for the image. The superimposition producing element 20 produces the superimposition image P9 for which the extraction image P7 and the original image P0 are calculated by adding weighting and both images are superimposed. Then, the operation of the image processing apparatus is over.

The above operations are main operations of the proposed image processing apparatus 1, or system or method of the present invention.

The image processing apparatus 1 has a reduction element 12 and a morphology processing element 19 to further increase visual recognition property of an image. As follows, these specific operations are illustrated.

Operation of the Reduction Element

When the original image P0 is input to the reduction element 12, the reduction element 12 reduces the original image P0 over plural steps and produces plural reduction image P1 having different reduction ratio. Then the reduction element 12 delivers plural reduction image P1 in addition to the unreduced original image P0 to the analysis element 13. Accordingly, plural extraction image P7 is extracted according to the reduction ratio.

The superimposition image producing element 20 superimposes these plural extraction image P7 adequately expanding to the original image P0.

The reason why the reduction element 12 is set up is illustrated. If a certain size differentiation filter is used to produce the extraction image P7 for the original image P0, the dark line having a thickness that is almost the same size of the differentiation filter is only extracted. Specifically, if a thicker dark line than the size of the differentiation filter is incorporated in the original image P0, it may not appear in the extraction image P7 because the line is too thick to extract.

Now, the effect when a reduction image P1 is used is illustrated. If the same size of differentiation filter used above to produce the extraction image P7 is used for the reduction image P1, the dark line that cannot be extracted in the analysis of the original image P0 can be extracted. Specifically, if an analysis using the reduction image P1 is performed, the line becomes relatively finer to the size of the pixel so that such thick line becomes extractable from the original image P0.

Further, if the large size differentiation filter is used for the original image P0 to produce the extraction image P7, the same effect can be obtained but the calculation cost can be largely cut by using the reduction image P1.

Operation of the Morphology Processing Element

When the extraction image P7 is input to the morphology processing element 19, the morphology processing element 19 performs closing arithmetic, a kind of morphology processing, on the extraction image P7 and deletes the fine false image extracted misrecognizing noises as a line structure in the extraction image P7. Accordingly, the extraction image P7 becomes more clearly incorporated a guide wire. Further, when a bright line is extracted, the same effect can be obtained by performing an opening arithmetic, a kind of morphology processing.

As above, according to the proposed invention, an image processing can be performed to enhance the linear structural object incorporated in the original image P0. Specifically, two methods distinguish the linear structural object incorporated in the original image P0. The first method is to produce the evaluation image P3 that evaluates whether each pixel is a linear structural object in the original image P0. Accordingly, the position of the linear structural object in the original image P0 is specified. The second method is to produce a difference image P6 incorporating a linear structural object by obtaining the difference between the linear structural object incorporated in the original image P0 and the other portion than the linear structural object. According to this method, it can be decided how much different pixel value the linear structural object in the original image P0 is incorporated with, in comparison with the pixel of the other than the linear structural object.

The characteristic of the present invention is that a linear structural object in the original image P0 can be extracted from the original image P0 holding the contrasting density in the original image P0 based in the image related to the linear structural object produced by such different method. The evaluation image P3 only contains the information about the position of the linear structural object in the original image P0. On the other hand, the difference image P6 includes the false image along with performing directional differencing processing in all area of the original image. If the extraction of the linear structural object by using two images having such drawback is performed, each drawback of the two methods can be compensated. Accordingly, as the obtained extraction image P7 from the original image P0 holding the contrasting density is the linear structural object only, its visual recognition property is high.

Further, as described above, if a reduction element 12 to reduce the original image P0 is equipped, a thick linear structural object included in the original image P0 can be also extracted.

As described above, if the analysis element 13 acts using the two-dimensional Hessian matrix, the position of the linear structural object and the extending direction of the linear structural object can be obtained accurately and at high-speed. And, as the evaluation image P3 acts the monotonic and non-linear function, the evaluation image P3 showing the position of the linear structural object in a close aspect to the binary image can be produced without disturbing the magnitude correlation of the evaluation values of the linear structural object.

The proposed invention further demonstrates that if the difference image producing element 17 acts using the anisotropic filter, it becomes possible to extract the shape of the linear structural object from the original image P0 with holding the contrast density of the linear structural object in the original image P0.

Further, if the morphologic processing is performed on the extraction image P7, as the fine false image in the extraction image P7, which is extracted by misrecognizing noises as a linear structure is deleted; the visual recognition property of the extraction image P7 is further improved.

And if a superimposed image P9 is produced by superimposing the extraction image P7 and the original image P0, the linear structural object can be further accurately recognized because the process in which the linear structural object is being incorporated in the image of the subject can be seen.

Next, the image processing apparatus 21 according to an embodiment 2 is illustrated. According to this embodiment, the image processing apparatus 21 comprises a constitution in which, referring to FIG. 11, when plural original image P0 obtained by continuous shooting over time are input, the processing image (superimposition image P9) for which brightness of a dark line such as a guide wire image incorporated in the original image P0 respectively is adjusted as it becomes visually easily recognizable is output.

Overall Constitution of the Image Processing Apparatus

Figure 11:
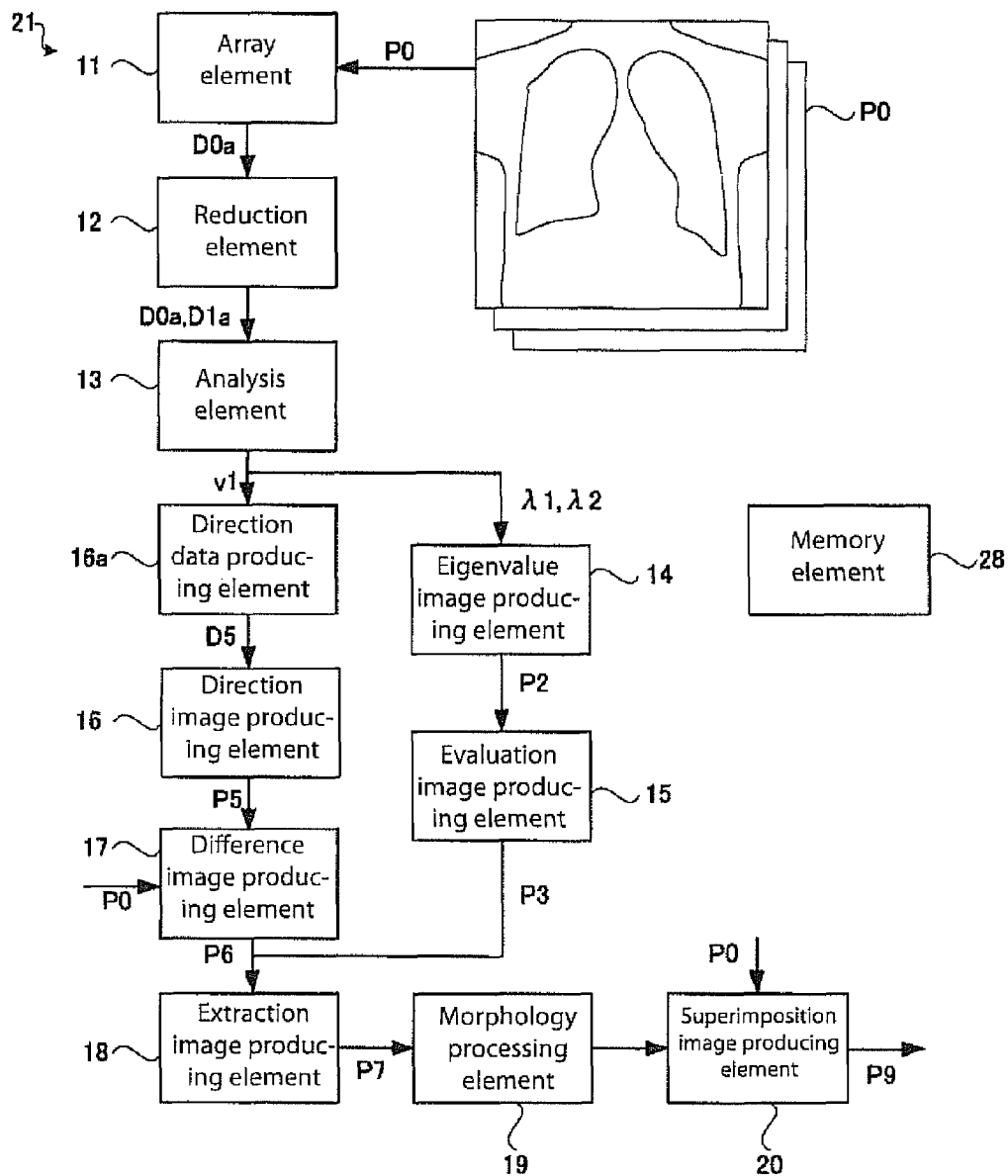
FIG. 11 is a block figure illustrating an image processing apparatus according to another aspect of the present invention.

Referring now to FIG. 11, according to a further embodiment, system, and method of the proposed invention, an image processing apparatus 21, provides an array element 11 that arrays plural original image P0 in time direction and produces the original data D0; the evaluation image producing element 15 that produces the evaluation image P3 that evaluates each voxel whether it is a plane structural object on voxel data, based on the original data D0; the direction data producing element 16a that produces the direction data D5 that indicates the normal line direction of the plane given each voxel is a plane-like structural object on the voxel data, based on the original data D0; the direction image producing element 16 that produces the direction image P5 that indicates the extending direction of the line given each pixel is a linear structural object of the original image P0, based on the direction data D5; a difference image producing element 17 that produces a difference image Pb in which a pixel value other than the linear structural object is subtracted from the pixel value of the portion of the linear structural object, based on the direction image P5; and an extraction image producing element 18 that produces the extraction image P7 in which the linear structural object in the original image P0 is extracted from the original image P0 holding the contrasting density in the original image P0, based on the evaluation image P3 and the difference image P6.

The array element 11 corresponds to an array means and the evaluation image producing element 15 corresponds to an evaluation image producing means of the present invention.

Further, the image processing apparatus 21 comprises a reduction element 12 that reduces and outputs the voxel data to the evaluation image producing element 15 and the direction data producing element 16a, the analysis element 13 that analyzes the voxel data by using three dimensional Hessain matrix and outputs the analysis results to the evaluation image producing element 15 and the direction data producing element 16a, an eigenvalue image producing element 14 that produces an eigenvalue data from the analysis results in the analysis element, a morphology processing element 19 that performs morphology processing for the extraction image P7, and a superimposition image producing element 20 that superimposes the extraction image P7 and the original image P0 and produce the superimposition image (processing image P9.)

The reduction element 12 corresponds to the reduction means of the present invention and the analysis element 13 corresponds to the analysis means of the present invention.

The operative memory element 28 is a memory apparatus that stores the filters and parameters when each element 11, 12, 13, 14, 15, 16a, 16, 17, 18, 19 and 20 act. Each element 11, 12, 13, 14, 15, 16a, 16, 17, 18, 19 and 20 can operatively access to the memory element 28 according to ongoing necessity.

Next, main operations of the image processing apparatus 21 are illustrated.

The image processing apparatus 21 operates with each element, mainly the array element 11, the evaluation image producing element 15, the evaluation image producing element 15, the direction data producing element 16a, the direction image producing element 16, the difference image producing element 17 and the extraction image producing element 18. Accordingly, operations of these main elements are illustrated.

Operation of Array Element

Figure 12:
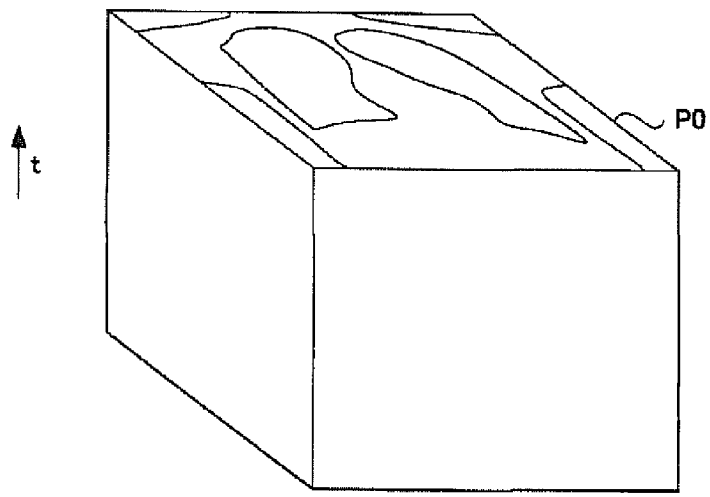
FIG. 12 is a schematic figure illustrating an operation of the image processing apparatus according to another aspect of the present invention.

Plural original image P0 composing moving images input to the image processing apparatus 21 are input to the array element 11. The array element 11, referring to FIG. 12, laminates and arrays the original image P0 in the order of input to produce three dimensional data. Accordingly, each original image P0 is processed to voxel data (hereinafter the original data D0) having a dimension about time.

The original image P0 is arrayed in the order of shooting by the array element 11. The array element 11 processes the pixels composing each original image P0, as they have thickness in time direction, to the voxels.

An actual operation of the array element 11 is performed on each original image P0 obtained overt time. Specifically, the array element 11 arrays predetermined number of other original image P0 in a past direction and in a future direction about the original image P0 subjected to processing (hereinafter processing subject image P0a) and produces voxel data so that the original image P0 should be in the center position relative to a time dimension. Accordingly, the original data D0 is produced as for each original image P0 obtained over time.

In the following illustration, an operation performed on one of the processing subject image P0a is illustrated. The voxel data corresponding to the processing subject image P0a is an original data D0a.

Operation of the Analysis Element

The original data D0a is input to the reduction element 12. For convenience sake of illustration, the reduction element 12 outputs the original data D0a to the analysis element 13 without performing reduction processing of the original data D0a. First, the analysis element 13 differentiates partially the original data D0a in horizontal direction, vertical direction and time direction.

A differentiation operation of the analysis element 13 is illustrated.

A position and a pixel value on the data correlate in the original data D0a. Specifically, if positions of x-direction, y-direction and time direction in the original data D0 are specified, the pixel value of pixels positioned there can be obtained. Specifically, referring to FIG. 12, the original data D0a are deemed as three variable functions to which the pixel values about three variables of x-direction (horizontal direction), y-direction (vertical direction) and t-direction (time direction) correlate. If the pixel value is d, a relation as $d=f(x, y, t)$ exists.

The analysis element 13 differentiates partially the original data D0a to x-direction by using a differentiation filter, and then further differentiates the differentiation function obtained at this time to x-direction, y-direction or t-direction.

Further, the analysis element 13 differentiates partially the original image P0 to y-direction, and then further differentiates the differentiation function obtained at this time to y-direction or t-direction. As well, the analysis element 13 differentiates partially the original image P0 to t-direction, and then further differentiates the differentiation function obtained at this time to t-direction. The analysis element 13 produces a three-dimensional Hessian matrix H by using these.

A Hessian matrix is the matrix shown as follows.

$$H = \begin{pmatrix} \frac{\partial^2 f}{\partial x^2} & \frac{\partial^2 f}{\partial x \partial y} & \frac{\partial^2 f}{\partial x \partial t} \\ \frac{\partial^2 f}{\partial y \partial x} & \frac{\partial^2 f}{\partial y^2} & \frac{\partial^2 f}{\partial y \partial t} \\ \frac{\partial^2 f}{\partial t \partial x} & \frac{\partial^2 f}{\partial t \partial y} & \frac{\partial^2 f}{\partial t^2} \end{pmatrix}$$ [Mathematic formula 2]

Such three-dimensional Hessian matrix is a symmetrical matrix and should have 3 eigenvalue $\lambda 1$, $\lambda 2$, $\lambda 3$ and their corresponding eigenvector. Then, an absolute value of the eigenvalue $\lambda 1$ is set as larger than an absolute value of the eigenvalue $\lambda 2$ and $\lambda 3$. The analysis element 13 obtains the eigenvalue $\lambda 1$, $\lambda 2$ and $\lambda 3$ from the Hessian matrix H. Among $\lambda 1$, $\lambda 2$ and $\lambda 3$ obtained at this point, the eigenvalue having the largest absolute value is $\lambda 1$, and the eigenvalue having the second largest one is $\lambda 2$.

The analysis element 13 calculates the eigenvector v1 corresponding to the eigenvalue $\lambda 1$. The eigenvector v1 is a vector that has elements of x-direction, y-direction and t-direction.

Now, the operation described above is an image processing about the processing subject image P0a. Accordingly, the analysis element 13 operates about the voxel positioning at the processing subject image P0a in the original data D0a and completes an analysis about the original data D0a.

Operation of Eigenvalue Image Producing Element

The analysis element 13 delivers the eigenvalue $\lambda 1$ and $\lambda 2$ to the eigenvalue image producing element 14. The Hessian matrix is that functions corresponding to the position of the processing subject image P0a are arrayed in a matrix. Accordingly, the value of the eigenvalue $\lambda 1$ should change corresponding to the position of the processing subject image P0a. The eigenvalue image producing element 14 arrays the value $\lambda 1/|\lambda 2|$ calculated from the eigenvalue $\lambda 1$ and $\lambda 2$ corresponding the position of the processing subject image P0a, and produces an eigenvalue image P2 in which $\lambda 1/|\lambda 2|$ are arrayed like a two-dimension matrix. $\lambda 1/|\lambda 2|$ that appear at this time is a benchmark indicating whether the voxel in the processing subject image P0a in the original data D0a composes a plane-like structural object.

Operation of the Evaluation Image Producing Element

The eigenvalue image producing element 14 evaluates the eigenvalue image P2 and delivers to an evaluation image producing element 15. The evaluation image producing element 15 adjusts $\lambda 1/|\lambda 2|$ value by acting predetermined function to each $\lambda 1/|\lambda 2|$ value. This aspect is already illustrated as the operation of the evaluation image producing element 15 according to Example 1. The evaluation image producing element 15 converts the eigenvalue image P2 and produces the evaluation image P3.

Meaning of the evaluation image P3 is illustrated.

An area where a value in the evaluation image P3 is close to 1 is the area where a dark line is incorporated in the processing subject image P0a, and an area where a value is close to 0 is the area where no dark line is incorporated in the processing subject image P0a. This point is already illustrated referring to FIG. 4.

Operation of the Direction Data Producing Element

The analysis element 13 delivers the eigenvalue vector v1 to the direction data producing element 16. The Hessian matrix is that functions corresponding to the position of the original data D0a are arrayed in a matrix. Accordingly, the eigenvector v1 should change corresponding to the position of the original data D0a. The direction data producing element 16a arrays the eigenvector v1 corresponding to the position of the original data D0a, and produces a direction data D5 in which the eigenvector v1 is arrayed like a two-dimensional matrix.

Meaning of the eigenvector v1 is illustrated.

Figure 13:
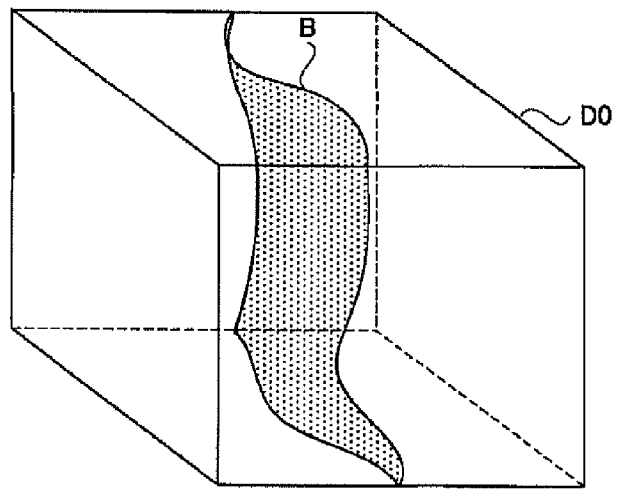
FIG. 13 is a schematic figure illustrating an operation of the image processing apparatus according to another aspect of the present invention.

Referring to FIG. 13, it shows how a dark line B incorporated into the processing subject image P0a in the original data D0a is expressed. Referring further to FIG. 13, the dark line B is expressed as a dark plane in the original data D0a since it is layered over time. Then, referring to FIG. 14, the voxel bx that is on the dark plane in the processing subject image P0a of the original data D0a is considered.

Figure 14:
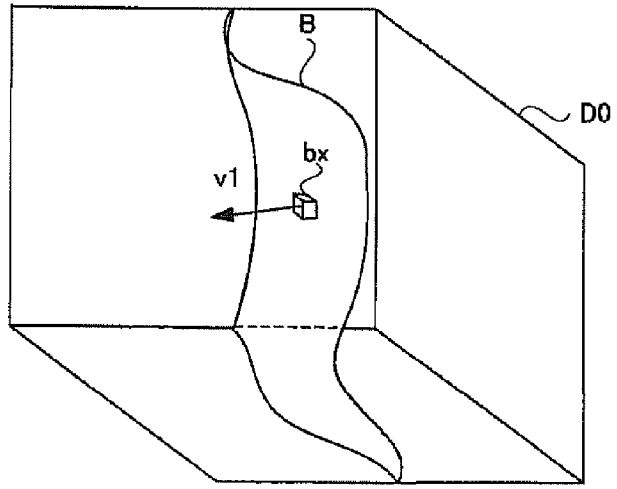
FIG. 14 is a schematic figure illustrating an operation of the image processing apparatus according to another aspect of the present invention.

The eigenvector for this voxel bx is shown as v1 in FIG. 14. The eigenvector v1 is an eigenvector related to the eigenvalue $\lambda 1$ that has a larger absolute value. Accordingly, the direction that the eigenvector v1 indicates shows the orthogonal direction (normal direction) to the plane contacting the dark plane in the voxel bx of the original data D0a.

Operation of the Direction Image Producing Element

Figure 15:
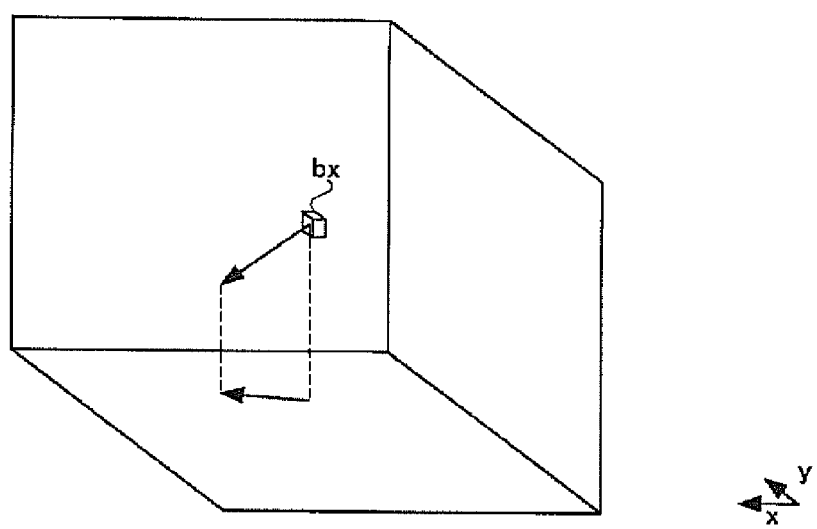
FIG. 15 is a schematic figure illustrating an operation of the image processing apparatus according to another aspect of the present invention.

The direction data D5 is delivered to the direction image producing element 16. Referring to FIG. 15, the direction image producing element 16 projects each eigenvector v1 composing the direction data D5 onto xy-plane and obtains the vector at that time. Then, an angle $\theta 1$ is an angle between these vectors and x-axis and an angle $\theta 2$ is calculated by adding 90° to the angle $\theta 1$.

Since the eigenvector v1 is arrayed to each voxel of the direction data D5 having the same sort of structure as the original data D0a, the angle $\theta 2$ is also arrayed like a two-dimensional matrix that have the same sort of the processing subject image P0a. Thus the direction image P5 is produced.

Operations of the Difference image Producing Element, the Extraction Image Producing Element and the Superimposition Image Producing Element The operation of the difference image producing element 17, the extraction image producing element 18 and the superimposition image producing element 19 is the same sort of the constitution according to Example 1. Specific constitutions are already illustrated referring to FIG. 7, FIG. 8, FIG. 9 and FIG. 10.

The extraction image P7 and the original image P0 are calculated by adding weighting and both images are superimposed to produce the superimposition image P9, and then the operation of the image processing apparatus 21 is over. Production of the superimposition image P9 is performed on each original image P0.

These are the main operations of the image processing apparatus 21 according to the present invention. The image processing apparatus 1 has a reduction element 12 and a morphology processing element 19 to further increase visual recognition property of an image. Next, these specific operations are illustrated.

Operation of the Reduction Element

When the original data D0$a$ is input to the reduction element 12, the reduction element 12 reduces the original data D01$a$ over plural steps and produces plural reduced data D1$a$ having different reduction ratio. Then the reduction element 12 delivers plural reduction data D1$a$ to the analysis element 13 in addition to unreduced original data D0$a$. Then, plural extraction images P7 in accordance with the reduction ratio are produced. The superimposition image producing element 20 superimposes these plural images P7 to the original data D0$a$ while accordingly expanding. Thus, the thick dark line incorporated into the original image P0 can be extracted from the original image P0.

This principle is the same operation principle of the reduction element 12 according to illustration or embodiment 1. An operation of the morphology processing element 19 is already illustrated according to illustration 1. Thus, the above constitution is that the present invention is applied to moving images.

Specifically, an image processing is performed to find a place structural object for the original data D0$a$ that arrayed the original image P0 in the time direction. Accordingly, even if many noise components are included in the original image P0, a linear structural object can be extracted accurately from the original image P0. Even if noises line up accidentally in the original image P0, these do not appear like a plane in the original data D0$a$. Because the noise appearance position in the original image P0 changes over time.

Accordingly, a cluster of the linear noises appeared in the original image P0 cannot be misrecognized.

Further, as described above, if a reduction element 12 to reduce the original data D0$a$ is equipped, a thick linear structural object included in the original image P0 can also be extracted. Then, the analysis element 13 operates using three-dimensional Hessian matrix, the position of the plane structural object and the normal line direction of the plane structural object can be obtained accurately and at high-speed.

EXPLANATION OF REFERENCES

P0 Original image
P3 Evaluation image
P5 Direction image
P6 Difference image
P7 Extraction image
D0$a$ Original data (Voxel data)
D5 Direction data
11 Array element (Array means)
12 Reduction element (Reduction means)
13 Analysis element (Analysis means)
15 Evaluation image producing element (Evaluation image producing means)
16 Direction image producing element (Direction image producing means)
16$a$ Direction data producing element (Direction data producing means)
17 Difference image producing element (Difference image producing means)
18 Extraction image producing element (Extraction image producing means)
19 Morphology processing element (Morphology processing means)
20 Superimposition image producing element (Superimposition image producing means)

Having described at least one of the embodiments of the present invention with reference to the accompanying drawings, it will be apparent to those skilled in the art that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope and spirit herein and any equivalents.

Unless specifically noted, it is intended that the words and phrases in the specification and claims be given the ordinary and accustomed meaning to those of ordinary skill in the applicable art or arts. As a non-limiting example, the phrase constitution reflects an ordinary and accustomed meaning of an arrangement, make-up, or characteristic. If any other meaning is intended, the specification will specifically state that a special meaning is being applied to a word or phrase. Likewise, the use of the words "function" or "means" in the claims is not intended to indicate a desire to invoke the special provision of 35 U.S.C. 112, paragraph 6 to define the invention. To the contrary, if the provisions of 35 U.S.C. 112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. 112, paragraph 6.

In the drawings and entire disclosure, there has been disclosed typical embodiment(s), features, steps, operations, or aspects of the invention and, although specific terms are employed, they are used in a generic and descriptive sense only and not for purposes of limitation, the scope of the invention being set forth in the following claims.

What is claimed is:

1. An image processing apparatus, that processes an original image containing a plurality of pixels obtained by sight-through of a subject, comprising:

an evaluation image producing circuit operative to produce an evaluation image that evaluates whether or not each said pixel in said original image is a linear structural object in said original image based only on said original image, whereby said evaluation image further contains information about a position of said linear structural object in said original image;

a direction image producing circuit operative to produce a direction image that indicates an extending direction to which a line extends from each said pixel in said original image;

a difference image producing circuit operative to produce a difference image from said original image in which a pixel value in a proximity of said linear structural object of the original image is subtracted from a pixel value of a portion of said linear structural object based upon said direction image;

an extraction image producing circuit operative to produce an extraction image in which the linear structural object in the original image is extracted from the original image based on said evaluation image and said difference image; and whereby a location of said linear structural object in said original image is obtained accurately and at high-speed in real time from said original image even under a noisy image environment.

2. An image processing apparatus, according to claim 1, further comprising:
a reduction circuit that is operative to reduce said original image and to output said original image to said evaluation image producing circuit and to said direction image producing circuit.

3. An image processing apparatus, according to claim 2, further comprising:
an analysis circuit that is operative to analyze the original image and differentiate said original image in a lateral direction and a longitudinal direction by using a two-dimensional Hessian matrix and to output the analysis results to said evaluation image producing circuit and said direction image producing circuit; and
wherein said evaluation image producing circuit and said direction image producing circuit further operate produce said evaluation image and said direction image, based on said analysis results of said original image.

4. An image processing apparatus, according to claim 1, further comprising:
an analysis circuit that is operative to analyze the original image and differentiate said original image in a lateral direction and a longitudinal direction by using a two-dimensional Hessian matrix and to output the analysis results to said evaluation image producing circuit and said direction image producing circuit; and
wherein said evaluation image producing circuit and said direction image producing circuit further operate to produce said evaluation image and said direction image, based on said analysis results of said original image.

5. An image processing apparatus, according to claim 1, wherein:
said evaluation image producing circuit uses a monotonic non-linear function to produce said evaluation image.

6. An image processing apparatus, according to claim 1, wherein:
said difference image producing circuit produces said difference image by performing a plurality of anisotropic filters on said original image following the direction indicated by said direction image.

7. An image processing apparatus, according to claim 1, further comprising:
a morphology processing circuit that performs a morphology processing on said extraction image.

8. An image processing apparatus, according to claim 1, further comprising:
a superimposition image producing circuit operative to produce a superimposition image by superimposing said extraction image and said original image, whereby said linear structural object can be further accurately recognized at high speed in a noisy environment.

9. An image processing apparatus, that processes an original image containing a plurality of pixels obtained by sight-through of a subject, comprising:
an evaluation image producing circuit operative to produce an evaluation image that evaluates whether or not each said pixel in said original image is a linear structural object in said original image based only on said original image, whereby said evaluation image further contains only information about a position of said linear structural object in said original image;
a direction image producing circuit operative to produce a direction image that indicates an extending direction to which a line extends from each said pixel in said original image, with a given that each said pixel from which said line extends is a pixel of the linear structural object in said original image based on said original image and said direction image is determined when pixel values in a proximity of said linear structural object are subtracted from pixel values of a region that is found to have the linear structural object in the original image;
a difference image producing circuit operative to produce a difference image in which a pixel value other than said linear structural object is subtracted from a pixel value of a portion of said linear structural object based upon said direction image;
an extraction image producing circuit operative to produce an extraction image in which the linear structural object in the original image is extracted from the original image based on said evaluation image and said difference image;
a reduction circuit that is operative to reduce said original image and to output said original image to said evaluation image producing circuit and said direction image producing circuit;
an analysis circuit that is operative to analyze the original image and differentiate said original image in a lateral direction and a longitudinal direction by using a two-dimensional Hessian matrix and to output the analysis results to said evaluation image producing circuit and said direction image producing circuit;
wherein said evaluation image producing circuit and said direction image producing circuit further are operative to produce said evaluation image and said direction image, based on said analysis results of said original image; wherein said evaluation image producing circuit uses a monotonic non-linear function to produce said evaluation image;
a morphology processing circuit operative to performs a morphology processing on said extraction image;
a superimposition image producing circuit operative to produce a superimposition image by superimposing said extraction image and said original image, and
whereby said linear structural object can be further accurately recognized at high speed in a noisy environment.

10. The image processing apparatus, according to claim 9, wherein:
said difference image producing circuit produces said difference image by performing a plurality of anisotropic filters on said original image following the direction indicated by said direction image.

11. An image processing apparatus, that processes an original image containing a plurality of pixels obtained by sight-through of a subject, comprising:
an evaluation image producing circuit operative to produce an evaluation image that evaluates whether or not each said pixel in said original image is a linear structural object in said original image based only on said original image, whereby said evaluation image contains only information about a position of said linear structural object in said original image;
a direction image producing circuit operative to produce a direction image that indicates an extending direction to which a line extends from each said pixel in said original image, with a given that each said pixel from which said line extends is a pixel of the linear structural object in said original image based on said original image and said direction image is determined when pixel values in a proximity of said linear structural object are subtracted from pixel values of a region that is found to have the linear structural object in the original image;

a difference image producing circuit operative to produce a difference image in which a pixel value other than said linear structural object is subtracted from a pixel value of a portion of said linear structural object based upon said direction image;

an extraction image producing circuit operative to produce an extraction image in which the linear structural object in the original image is extracted from the original image based on said evaluation image and said difference image;

a reduction circuit that is operative to reduce said original image and to output said original image to said evaluation image producing circuit and said direction image producing circuit;

said evaluation image producing circuit uses a monotonic non-linear function to produce said evaluation image;

a morphology processing circuit operative to performs a morphology processing on said extraction image; and whereby a location of said linear structural object in said original image can be obtained accurately and at high-speed in real time even under a noisy environment.

12. The image processing apparatus, according to claim 11, further comprising:

an analysis circuit that is operative to analyze the original image and differentiate said original image in a lateral direction and a longitudinal direction by using a two-dimensional Hessian matrix and to output the analysis results to said evaluation image producing circuit and said direction image producing module; and wherein said evaluation image producing circuit and said direction image producing circuit further are operative to produce said evaluation image and said direction image, based on said analysis results of said original image.

13. The image processing apparatus, according to claim 12, wherein:

said difference image producing circuit produces said difference image by performing a plurality of anisotropic filters on said original image following the direction indicated by said direction image.

14. The image processing apparatus, according to claim 13, further comprising:

a superimposition image producing circuit operative to produce a superimposition image by superimposing said extraction image and said original image, whereby said linear structural object can be further accurately recognized at high speed in a noisy environment.

* * * * *